May 28, 1963     R. W. CASS     3,091,502
THERMALLY BALANCED PISTON
Filed Aug. 15, 1960
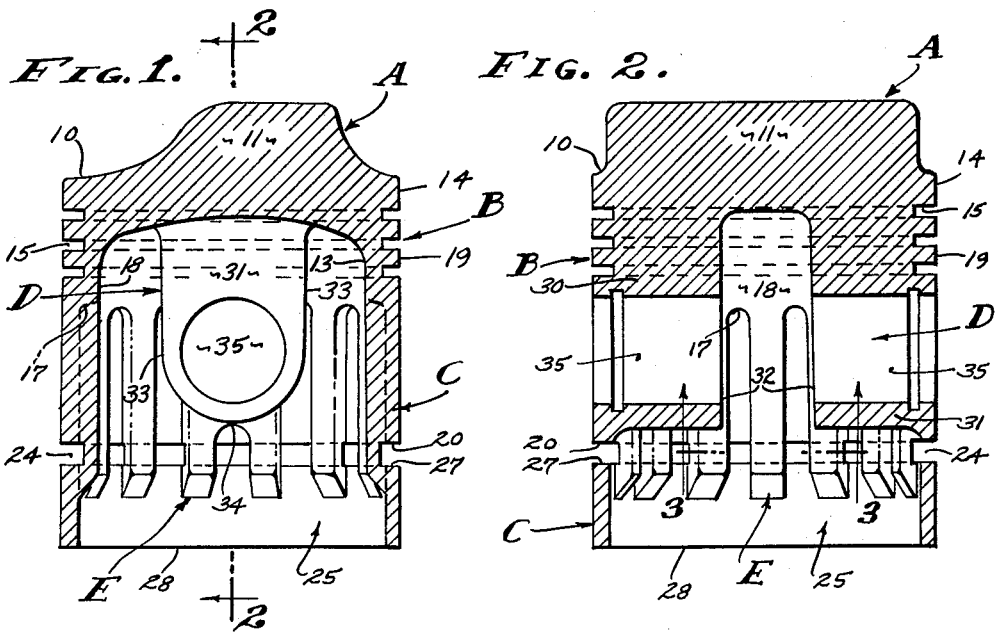
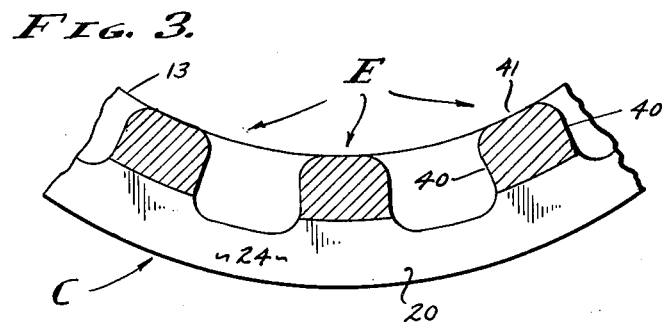
INVENTOR.
RICHARD W. CASS
BY
    W. H. Maxwell
           AGENT 3,091,502
THERMALLY BALANCED PISTON
Richard W. Cass, Huntington Park, Calif., assignor to Harvey Aluminum (Incorporated), Torrance, Calif., a corporation of California
Filed Aug 15, 1960, Ser. No. 49,763
2 Claims. (Cl. 309—9)

This invention relates to a piston and it is particularly concerned with a high strength thermally balanced piston construction wherein heat absorption is away from the wrist-pin area, it being a general object of this invention to provide a piston of the character referred to that can be produced mainly by means of plastic deformation of the metal forming the same.

In the internal combustion engine art there is the art of piston design and manufacture in order to supply, on a commercial basis, pistons in mass production for operation in the cylinders of engines. These are heat engines wherein fuels are combusted in the upper chambered end portions of the cylinders in order to drive the pistons inwardly, after which the pistons are returned outwardly either to exhaust burnt gases and/or to compress new charges of fuel or air, or both. In any case, both two and four cycle internal combustion engines are familiar and need not be set forth in detail, said engines being generally and characteristically the same. However, the present invention deals with new and useful improvements in the structure of the pistons per se, in order to overcome certain inefficiencies and mechanical drawbacks that ordinarily prevail in connection with piston design and manufacture.

The problems which are to be considered are mainly weight, strength, and heat absorption or dissipation. So far as weight is concerned, aluminum alloys are commonly employed to construct pistons and in order to gain strength reinforcing design configurations have been resorted to. In order to gain the said reinforced configuration said pistons have been made by casting processes and like methods. In any case, however, the bearing portions of the piston that necessarily surround the wrist-pin connection are such as to absorb heat too readily from the laterally adjacent and intermediate skirt portions, all with the result that the ordinary and usual piston suffers from overconcentration of heat at and surrounding the wrist-pin connection area. This phenomenon will be borne out by the examination of any ordinary piston that has been operated a susbtantial length of time, or at elevated temperatures.

Heat dissipation in piston construction is a major problem and results from the absorption of heat through the head portion of the piston from the burning gases used to reciprocate said piston. The piston, charcterized by an integral body comprising generally the head portion and skirt depending therefrom, collects this absorbed heat and conducts it toward other engine parts and to the body of lubricating oil contained by the engine. Obviously, the cylinder walls of the engine are not too effective in transferring heat since there is an oil film therebetween and because said cylinder is itself a highly heated element of the engine. The wrist-pin connection is not to be relied upon for high heat transfer since the bearing area is ilmited and the cross sectional area of the connecting rod is small. As a result, it is necessary to rely upon the transfer of heat into the fluids within the crankcase of the engine, said fluids being air and oil and air-oil mists or vapors, etc.

It is an object of this invention to provide a thermally balanced piston adapted to dissipate absorbed heat into fluids within the crankcase of an internal combustion engine. The piston herein disclosed includes structural elements in the form of ribs that are placed so as to enable the piston to conduct heat away from the heavy section areas thereof and so that the crankcase fluids absorb said heat more readily.

An object of this invention is to provide a piston of the character referred to that is reinforced structurally so that a light weight piston is feasible. The piston herein disclosed is characterized by longitudinally axially disposed ribs that act as columns and/or beams in order to distribute loads and heat throughout the length of the piston.

Another object of this invention is to provide a piston and having ribs and wherein the said ribs are disposed so as to carry the lower terminal end portion of the piston, said terminal end portion being severed from the piston except for said joinder with and through said ribs.

It is still another object of this invention to provide a piston construction that can be produced primarily by means of plastic deformation of metal, resulting from the force or pressure of die parts. Broadly, however, any equivalent method of manufacture can be employed, said piston being characterized by its adaptability to being drawn or formed along parallel longitudinal axial disposed lines of configuration.

The various objects and features of my invention will be fully understood from the following detailed description of the typical preferred form and application thereof, throughout which description reference is made to the accompanying drawings, in which:

FIG. 1 is a longitudinal transverse sectional view taken through a typical piston embodying the features of this invention.

FIG. 2 is an end view of the piston, taken as indicated by line 2—2 on FIG. 1.

FIG. 3 is an enlarged detailed sectional view of a portion of the piston structure, taken as indicated by line 3—3 on FIG. 2.

The piston, as it is clearly illustrated in the drawings, comprises generally, a head portion A, a ring portion B, a skirt portion C, wrist-pin bearings D, and in accordance with the invention it includes longitudinally axially disposed ribs E that permit the severance of the lower terminal end portion of the skirt portion C as later described. The head portion A is a diametrically disposed wall element with the ring portion B formed at the periphery thereof. The skirt portion C depends from the ring portion to establish the cylindrical configuration of the piston, and the wrist-pin bearings D are enlargements of the body of material forming the piston and is positioned intermediate the top and bottom thereof. As shown, the ribs E extend so as to carry the lower terminal end of the skirt, there being a ring (not shown) carried by the piston at said lower terminal end portion.

Various methods can be employed in the manufacture of this piston, however it is preferred to extrude or forge a body of metal, for example an aluminum alloy, by means of applying pressure. The process of plastic deformation is preferred because of the high density and resultant high strength of the product thus formed, but this process does not lend itself to the usual circumferentially reinforced designs that have been commonly employed. That is, circumferentially disposed reinforcements that project radially inward cannot be formed by the usual die parts, in such a piston, for obvious reasons. Therefore, the ribs E are provided which are longitudinally and axially disposed in order to reinforce the skirt C.

Together with the reinforcement function of the ribs E is the primarily important heat conducting and dissipating function thereof. The said longitudinal and axial disposition of the ribs E is such as to directly transfer and draw heat from the head portion A and ring portion B to dissipate said heat into the fluids that circulate within the crankcase of the engine and also within the interior of the piston.

The head portion A of the piston can vary as circumstances require, a dome type of head being shown which is adapted for use in a two cycle engine. Generally, the portion A is a disc-shaped element disposed in a diametrical plane, to form a wall closing the diameter of the cylinder in which it operates. In the case illustrated, the portion A has a coplanar circumferential marginal portion 10 and a central upwardly projecting dome 11. As shown, the dome 11 can be asymmetrical, all as desired, the head portion A being characterized by its substantial thickness for strength.

The ring portion B is integral with the head portion A and depends therefrom at the periphery of the piston. In other words, the portion B is cylindrical in form and more specifically it depends from the marginal portion 10 of the head portion A. The portion B has inner and outer diameter walls 13 and 14 of sufficient thickness to allow for annular cuts to be made therein in order to form grooves 15 for carrying the rings (not shown). Thus, the ring portion B is also characterized by its substantial thickness for strength, having radial thickness. The axial thickness of this element occurs between its bottom wall 17 and the top of the marginal portion 10.

The skirt portion C is integral with the ring portion B and depends therefrom to give the overall piston a hollow cylinder configuration. Thus, the portion C has an inner wall 18 and an outer wall 19, concentric with each other, said outer wall 19 forming a continuation of the outer diameter wall 14 of the portion B. The portion C is of relatively small thickness radially and it terminates in a flat bottom end 20 in a plane normal to the axis of the piston.

In the preferred form, the piston includes the lower terminal end portion 25 of the skirt portion C, said end portion 25 being severed from the remainder of the skirt portion and spaced from the end 20. In practice, the end portion 25 is first formed as an integral part of the said skirt portion proper and is then separated therefrom by an annular cut therein to form a groove 24 for carrying a ring (not shown). It is intended that the ring be a so-called "oil ring" and such as to require communication with the interior of the piston. Therefore, the end portion 25 is completely severed from the skirt portion C, throughout 360°, by means of a single cut to establish the groove 24, thereby forming a top end 27 that opposes the bottom end 20. The portion 25 terminates in a flat terminal end 28 in a plane normal to the axis of the piston and spaced below the bottom end 20.

The wrist-pin bearings D, as above stated, are enlargements and they are characteristically boss-shaped elements 30 and 31 integral with the side walls of the piston, or skirt portion C, and they project inwardly at diametrically opposite sides of the piston. In the base illustrated, where the piston is to be formed primarily by plastic deformation, the boss-shaped elements 30 and 31 are elongated and extend into the head portion A. Thus, the boss portions 30 and 31 are alike, having opposed inner faces 32 and parallel sides 33 that extend transversely to merge with the inner diameter wall 14 and with the inner wall 18 of the portions B and C, respectively. The said boss elements terminate in coplanar bottoms 34, and they are drilled or bored at 35 on a common transverse diametrically extending axis, to receive a wrist-pin (not shown).

The longitudinal and axially extending ribs E are provided to reinforce the piston, to dissipate heat therefrom, and to carry the lower terminal end portion 25. As shown, there is a plurality of ribs E spaced apart circumferentially of the skirt portion C. The ribs E are alike and each has parallel sides 40 and an inner edge 41. The sides 40 extend generally in a radially inward direction from the inner wall 18 of the portion C and the edge 41 can merge with the inner diameter wall 13 of the portion B. In accordance with the invention, the ribs are substantially coextensive with the axial extent of the piston, extending from the head portion A downwardly to the terminal end 28. The said ribs are each integral with the said portions A, B and C and with the said inner terminal end portion 25, as it is initially formed and before its severance by a separate and subsequent cutting operation.

From the foregoing it will be seen how the piston of the present invention is formed and by the processes preferred in said formation. As is stated, the piston is readily formed by the forging, or the like, wherein a body of material, for example aluminum alloy, is placed in a female die (not shown) and pressure applied with a male die (not shown) to produce plastic flow of material. It is significant that all the longitudinal and axial extending walls and faces are formed with little or no draft angle, and in practice, for example, the sides 40 of the ribs E are perfectly parallel as specified, the extruded piston part being stripped by suitable means from the die parts.

With the piston formed as hereinabove specified, a highly durable and light weight piston is constructed with the ability to readily dissipate heat absorbed at the heavier head and ring portions A and B. The ribs E are contiguous with said portions A and B and directly transfer heat downwardly by conduction whereby said heat is absorbed from the fin-shaped ribs by crankcase fluids. By providing adequate transfer heat throughout the length and circumferential extent of the piston, heat does not tend to concentrate at the heavier bosses 30 and 31, and on the contrary is absorbed and conducted away from said bosses, thereby eliminating the tendency for overheating at the wrist-pin connection of the piston. Further, the oil communication between the annular groove 46 and the interior of the piston is accomplished by a single machining operation, porting the skirt and exposing the interior diameter of the oil ring substantially throughout its 360° circumference.

Having described the preferred form and application of my invention, I do not wish to be limited or restricted to the specific details herein set forth but I wish to reserve to myself any variations or modifications that may appear to those skilled in the art and fall within the scope of the following claims.

Having described my invention I claim:

1. A piston for operation in the cylinder of an internal combustion engine and wherein it absorbs heat from the burning gases and including, a head portion and surrounding ring portion of substantially heavy cross-section, a skirt portion of substantially light cross-section and depending from the head portion and a lower terminal end portion separate from the said skirt portion, and circumferentially spaced longitudinal axially disposed ribs contiguous with all of said portions and extending from the head and ring portion and along said skirt portion and joining the separate end portion to the skirt portion, said ribs being thin-shaped and adapted to dissipate heat from all of said portions and into surrounding fluids and whereby there is heat conduction from the head and ring portion downwardly toward the said end portion of the piston.

2. A piston for operation in the cylinder of an internal combustion engine and wherein it absorbs heat from the burning gases and including, a head portion and surrounding ring portion of substantially heavy cross-section, a skirt portion of substantially light cross-section and depending from the head portion and a lower terminal end portion separate from the said skirt portion with a ring groove therebetween, and circumferentially spaced longitudinal axially disposed ribs contiguous with all of said portions and extending from the head and ring portion and along said skirt portion and joining the separate end portion to the skirt portion and forming said ring groove therebetween, said ribs being thin-shaped and adapted to dissipate heat from all of said portions and into surrounding fluids and whereby there is heat conduction from the head and ring portion downwardly toward the said end portion of the piston.

References Cited in the file of this patent

UNITED STATES PATENTS

| | | |
|---|---|---|
| 1,503,267 | Keenan | July 29, 1924 |
| 2,494,748 | Ernestus | Jan. 17, 1950 |
| 2,544,494 | Flint | Mar. 6, 1951 |
| 2,685,729 | Daub | Aug. 10, 1954 |
| 3,010,186 | Townhill | Nov. 28, 1961 |

FOREIGN PATENTS

| | | |
|---|---|---|
| 568,899 | Great Britain | Apr. 25, 1945 |